July 18, 1950 M. CAMRAS 2,515,190
RECORD PROTECTOR FOR MAGNETIC RECORDING AND REPRODUCING DEVICES
Filed July 17, 1944

Inventor
Marvin Camras
by [signature] Attys

Patented July 18, 1950 2,515,190

UNITED STATES PATENT OFFICE 2,515,190

RECORD PROTECTOR FOR MAGNETIC RECORDING AND REPRODUCING DEVICES

Marvin Camras, Chicago, Ill., assignor to Armour Research Foundation of Illinois Institute of Technology, a corporation of Illinois Application July 17, 1944, Serial No. 545,307

9 Claims. (Cl. 179—100.2)

This invention relates to improvements in a record protector for magnetic recording and reproducing devices, and more particularly to means for preventing the unintentional or accidental removal of a magnetic recording from a paramagnetic medium when that medium is mounted on a magnetic recording and reproducing device, although the invention may have other uses and purposes as will be apparent to one skilled in the art.

In magnetic recording and reproducing devices, a substantially permanently magnetizable medium in the nature of a fine wire or tape is usually wound from one reel or spool to another reel or spool. Frequently the medium travels in the forward direction for both recording and reproduction, and travels in the reverse direction for rewinding purposes. It is customary in devices of this character which both record and reproduce to employ what may be termed an erasing head to demagnetize or otherwise clean the wire of a previous recording just prior to the placing of a new recording upon that medium. Upon the rewind and reproduction operations, the erasing head is automatically cut out of service. The reels or spools carrying the recording medium are removable and replaceable upon the device at will.

It has been proposed to place recordings upon such reels or spools, and then furnish the spools with the recorded medium thereon for use in homes and similar locations on reproducing devices. If the device is also capable of recording as well as reproducing, as most such devices are, it is desirable to prevent the accidental erasing or removing of some of the recording upon a spool. For example, if a customer purchases a spool having an opera recorded thereon, and intends to use that spool only for reproduction purposes when so desired, it is desirable to prevent any unintentional removal of a portion of the recording from the medium carried on that spool. Such unintentional removal of a portion of the recording could occur with a magnetic instrument capable of both recording and reproduction, in the event the instrument was set for recording unbeknownst to the operator, and with the erasing head in effective operation. Some of the valuable recording would then be lost before the operator realized that the machine was not set to reproduce.

Accordingly, it is an important object of the instant invention to provide means for protecting magnetic records from unintentional or accidental destruction.

Another object of this invention is to provide a magnetic recording and reproducing device equipped with means automatically operable to stop rotation of certain types of reels or spools if the device is set for a recording operation, and such stopping of the spool would occur before any but the most negligible part of the recording had been adversely affected.

It is also an object of this invention to provide a spool or reel for carrying a recording medium, which spool or reel is especially constructed to co-operate with a recording and reproducing machine equipped with stopping mechanism for such a reel, which stop mechanism operates when the machine is set for a recording operation, so as to prevent rotation of the particular spool or reel.

Also a feature of the invention resides in the provision of a spool for a magnetic recording medium carrying means for co-operation with means on the magnetic recording and reproducing device, so that the spool will not be movable in the event the device is set for a recording operation, but which means may be easily adjusted or removed relatively to the spool to permit rotation of the spool for a recording operation if so desired.

Also a feature of the invention resides in the provision of a magnetic recording and reproducing device having means associated therewith to prevent rotation of a certain type of medium carrying spool if the machine or device is set for a recording operation, such means being ineffective in so far as other types of recording medium carrying spools are concerned.

It is a further object of this invention to provide a combination of a particular type spool and a magnetic recording and reproducing device wherein by co-operative means the spool is rendered immovable when the device is set for a recording operation, the co-operable means being entirely concealed from view and very easily operable automatically in conjunction with another necessary operation on the device.

While some of the more salient characteristics, features and advantages of the instant invention have been above pointed out, others will become apparent from the following disclosures, taken in conjunction with the accompanying drawing, in which.

As shown in the drawing.

Figure 1:
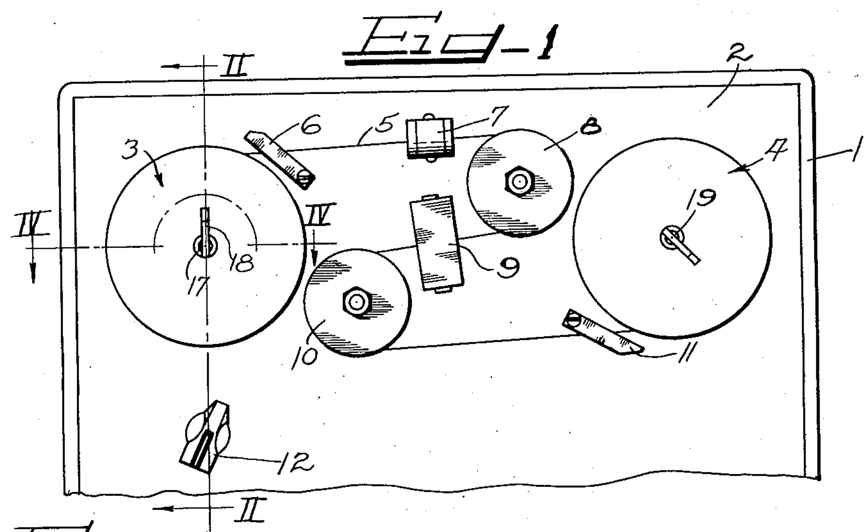
Figure 1 is a fragmentary front elevational view of a magnetic recording and reproducing device equipped with record carrying spools, embodying principles of the instant invention.

In the illustrated embodiment of this invention there is shown a magnetic recording and reproducing device including a cabinet or casing 1 having a front panel 2 upon which substantially all of the instrumentalities of interest in connection with the present invention are mounted. In an easily accessible location on the front of the panel 2 a pair of spaced reels or spools 3 and 4 may be removably mounted, and these spools carry a recording medium 5 which, in the illustrated instance, is shown in the form of a fine permanently magnetizable wire. The recording medium is partially wound about both of the spools and travels from one to the other depending upon the nature of the operation.

For example, the wire will travel from the spool 3 to the spool 4 for both recording and reproducing operations, and will travel in the reverse direction from the spool 4 to the spool 3 during a rewinding process.

During the travel of the wire in the forward direction, the wire first passes through a level winding instrumentality 6, then through an erasing head 7, around a guide pulley 8, through the field of a recording and reproducing head 9, thence over another guide pulley 10, through another level wind arrangement 11, and on to the reel 4. The recording medium follows the same path for both recording and reproducing operations, and the head 9 functions for both such operations. During a recording, the wire is magnetized longitudinally thereof by the head 9. During a reproducing operation, the head 9 functions as a pickup member for the impulses previously recorded upon the medium.

The erasing head 7 may be in the nature of a coil carrying a high frequency current which functions to demagnetize the recording medium prior to its reaching the recording head. The erasing head may be in several other forms, if so desired, it being only necessary that the wire pass through the field of the erasing head, and it is not necessary that the wire pass through the erasing head, as illustrated. The erasing head only operates during a recording operation. During a reproducing operation or a rewinding operation, the erasing head is automatically deenergized by any suitable means, not illustrated.

The device is set for either a recording or reproducing operation by means of a control member 12 which, in the illustrated instance, is shown as a dial. As viewed in Figure 1, the member 12 is moved to reproducing position. In order to set the device for a recording operation, the member 12 would be moved counterclockwise from its position in Figure 1. This member may either have a neutral position, or be automatically rendered ineffective by some other suitable control for rewinding purposes.

With the recording and reproducing device as above described, a recording medium may be caused to travel in the forward direction, and have a recording placed thereon by the magnetization of the medium during its travel. Then it may be rewound from the spool 4 back upon the spool 3 in a rewinding operation. After that, the medium may be again moved forwardly and the previous recording reproduced from the medium.

Frequently, a spool will carry a medium having a record thereon that it is desired to preserve. Such may be a purchased record of an opera, a play, an oration, or some other production. Consequently, it is desirable to avoid any unintentional or accidental erasing of a portion of that recording. This could happen by placing the particular spool or spools upon the machine, and starting the medium traveling in the forward direction with the device set for a recording rather than a reproduction. With the device set for a recording, the erasing head 7 would be in effective operation, and a goodly portion of the recording might be removed or cleaned from the wire before the operator became aware that the device was not set for a reproducing operation. In other instances, it may be desired to repeatedly record, listen, and then again record upon the same wire or medium. In the latter event, it would be desirable to remove the first recording from the medium, and it would be intended that the erasing head function.

The present invention particularly seeks the accomplishment of either of these results, that is, permitting the erasure of a previous recording, and preventing the erasure of a recording of a type that would be preserved, without any particular adjustment of the machine or even a thought on the part of the operator. The invention also makes it possible to reuse a medium having a recording of the character normally preserved thereon, when it is desired to dispense with that preserved recording, and this requires only a very simple adjustment or removal of parts on the part of the operator.

In general, the reels or spools 3 and 4 are of the same construction, regardless of whether or not a recording is to be preserved against accidental erasure. As seen best in Figures 2 and 4, each spool includes a barrel portion 13, with integral side flanges 14 extending beyond the barrel. The inside portion of the barrel is hollowed to provide an annular cavity 15 around a central hub 16. Such cavity renders the spool lighter in weight. The spool 3 is mounted upon a shaft 17 projecting through the panel 2 to which it may be locked by any suitable form of lever mechanism such as is indicated at 18 in Figure 1. In similar manner, the spool 4 is removably connected to the protruding end of the shaft 19. Each of these shafts may function in turn as a driven shaft or an idler shaft depending upon the direction of movement of the recording medium. For example, if the medium moves in the forward direction, the shaft 19 will be connected to driving apparatus not illustrated, and thus the spool 3 will be a supply spool and the shaft 17 will idle. During a rewind operation, the shaft 17 will be connected to the driving apparatus, and the spool 4 in that event will be the supply spool and the shaft 19 will idle.

Where a medium is to be used repeatedly for different recordings, and the recordings erased successively as a new recording is put upon the same medium, the spool structure will be as above described. In that event where it is desired to preserve the recording against accidental erasure of a part of it, the spool is preferably provided with additional structure. In the illustrated instance, a spool for a recording to be preserved may be equipped with a series of projecting elements 20 in the nature of pins threadedly engaged with the spool barrel as indicated at 21 and extending axially of the spool inside the cavity 15. In the illustrated instance, there are four such pins shown, but it is obvious that any other suitable number may be used, one being sufficient in many cases.

Figures 2, 3, 4:
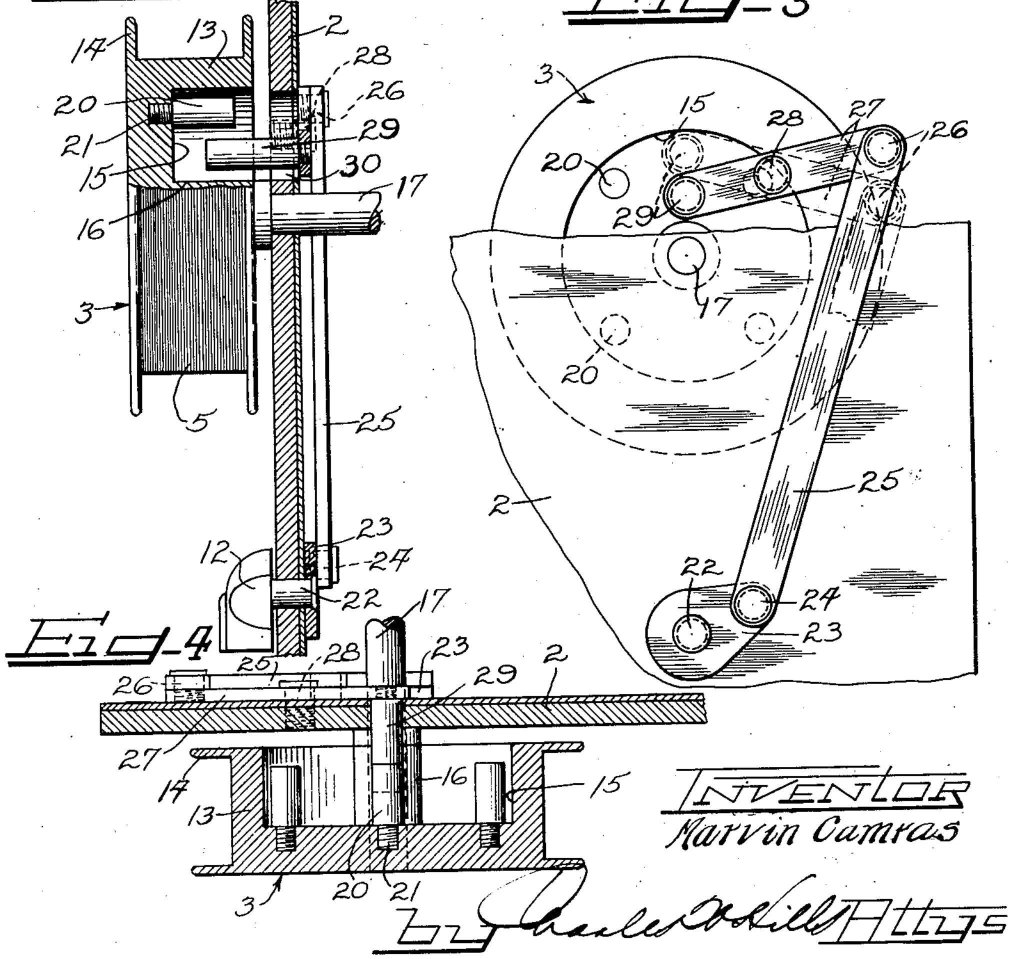
Figure 2 is an enlarged fragmentary vertical sectional view through the front panel of the device in Figure 1 taken substantially as indicated by the line II—II of Figure 1, looking in the direction of the arrows, and showing certain parts in elevation.
Figure 3 is a fragmentary rear elevational view, with parts broken away, of the structure seen in Figure 2.
Figure 4 is a fragmentary plan section view through the apparatus taken substantially as indicated by the line IV—IV of Figure 1.

In order to effect a stopping of a reel carrying the projecting members 20, a linkage is connected with the control member 12. As best seen in Figures 2 and 3, the shaft 22 of this member has a collar lever 23 secured to its inner end. The free end of the lever 23 is pivoted as at 24 to one end of a link 25. The opposite end of the link is freely pivoted as at 26 to the outer end of a lever 27 pivoted as at 28 to the panel 2 at an intermediate point. The opposite end of this lever 27 carries a stop pin 29 which extends into the cavity 15 of the reel, the panel 2 having an opening 30 therein to accommodate the pin 29.

When the control member 12 is in the position seen in Figure 1, which is the position for a reproducing operation, the reel 3 will be free to rotate on the shaft 17. The stop pin 29 will then be in the position seen in Figures 2 and 3, and the projecting members 20 carried by the reel are spaced radially outwardly beyond the stop pin, and so will never contact this pin. If the control member were inadvertently in the recording position, that is, counterclockwise from the position seen in Figure 1, the stop pin 29 would be elevated to the dotted line position of Figure 3 directly in the path of the projecting members 20 carried by the reel. One of these projecting members would abut the stop pin and prevent any further rotation of the particular reel. The relatively short movement of the reel before it was thus stopped would not be sufficient to cause a noticeable erasure of the recording on the medium carried by the reel. Thus it will be seen that the means above described effectively prevent the unintentional or accidental erasure of a recording of the type to be preserved.

In the event it is ever desired to remove a recording that up till then had been carefully preserved, and reuse the medium for another recording, it is a simple expedient to unscrew the projecting members 20 from a particular reel, place the reel upon the device, and operate the device for recording purposes, with the erasing head in effective operation. Without the projecting members 20 in the reel, the reel is free to turn on the shaft 17 and it makes no difference in what position of adjustment the stop pin 29 may be. It will then simply occupy some position within the cavity 15 of the reel and not interfere in any manner with the rotation of the reel.

As to the novel features of the reel itself, these are more fully set forth, described and claimed in my copending application entitled "Reel," filed February 1, 1946, Serial No. 644,818.

From the foregoing, it is apparent that I have provided simple means for effectively preventing the accidental or unintentional cleaning of a recording medium carrying a record that should be preserved. If the particular spool carrying that record is placed upon a recording and reproducing device, which is inadvertently set for a recording operation, the spool will not rotate and thus no erasure of the record on the medium may occur. It will also be appreciated that it is a simple expedient to make a simple adjustment upon the reel and thus adapt it for rotation in the event it is ultimately desired to remove the record from its medium. Further, reels carrying records to be preserved as well as reels carrying media for repeated recordings and erasures will operate effectively on the same device, and no thought or special action on the part of the operator is necessary for the operation of either type of reel. The operator need only go through the necessary motions, and a reel carrying a valuable record will be prevented from operation in the event the device is set for recording, and a reel not carrying such a record will not be so prevented. It will also be appreciated that the instant invention is not only highly efficient in operation, but extremely economical to manufacture and use.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a magnetic recording and reproducing device, a pair of rotary reels, a magnetizable recording medium carried by said reels, an erasing head adjacent the path of said medium, a recording and reproducing head adjacent the path of the medium, a control member to selectively set the device to operate for recording or reproduction, and cooperable mechanical means between one of said reels and said control member and a part of which are moved into operative position by a movement of said control member to recording position to prevent rotation of said reel when said member is set for recording.

2. In a magnetic recording and reproducing device, a pair of rotary reels, a magnetizable recording medium carried by said reels, an erasing head adjacent the path of said medium, a recording and reproducing head adjacent the path of the medium, a control member to selectively set the device to operate for recording or reproduction, projecting means carried by one of said reels, and mechanical means movable into the path of said projecting means by said control member to block movement of said reel when said control member is moved to recording position.

3. In a magnetic recording and reproducing device, a pair of rotary reels, a recording medium carried by said reels for travel from one to the other, erasing means to clean the medium when the device is to record, recording and reproducing means adjacent the path of the medium between said spools, a control member to selectively set the device for recording or reproduction, and mechanical means operable by said control member to physically block the movement of one of said reels when the member is in recording position.

4. In combination, a magnetic recording and reproducing device having means for supporting rotary reels carrying a magnetizable recording medium, means to clean said medium, means for recording on or reproducing from said medium, a control member to set said device for recording or reproduction, shiftable mechanical means responsive to the movement of said control member, and a reel carrying projecting means for abutting said shiftable means when said member is moved to recording position and thus prevent rotation of said reel to avoid accidental cleaning of the medium on said reel.

5. In combination, a magnetic recording and reproducing device having means for supporting rotary reels carrying a magnetizable recording medium, means to clean said medium, means for recording on or reproducing from said medium, a control member to set said device for recording or reproduction, and shiftable means responsive to the movement of said control member, and a reel carrying projecting means for abutting said shiftable means when said member is moved to recording position and thus prevent rotation of said reel to avoid accidental cleaning of the medium on said reel, said projecting means being selectively removable from said reel to permit cleaning of the recording medium if so desired.

6. In combination, a magnetic recording and reproducing device wherein a previous recording on a magnetizable recording medium is removed prior to the making of a new recording, a control member on said device to set the device for either recording on or reproducing from the medium, a reel carrying a medium having a recording thereon and said reel having a cavity in its inner face, a projection carried by said reel and extending into said cavity, and stop means connected with said control member and movable thereby into the path of said projection when said control member is moved to recording position.

7. In combination, a magnetic recording and reproducing device wherein a previous recording on a magnetizable recording medium is removed prior to the making of a new recording, a control member on said device to set the device for either recording on or reproducing from a medium, a reel carrying a medium having a previous recording, and stop means of which a part is carried by said reel and a part is movable by said control member into the path of the part carried by the reel whenever the control member is moved to recording position to block movement of said reel.

8. In combination, a magnetic recording and reproducing device wherein a recording is made on a magnetizable recording medium, a control means to set the device in record position, a medium carrier carrying a medium for a recording thereon, abutment means carried by said medium carrier, stop means to prevent movement of said medium with said control means in its record position, and means actuated by said control means to cause said abutment means to actuate said stop means.

9. In combination, a magnetic recording and reproducing device wherein a previous recording on a magnetizable recording medium is removed prior to the making of a new recording, a control member to selectively set the device for either recording on or reproduction from the medium, a reel carrying a medium having a recording thereon, and cooperable stopping means carried in part by said reel and in part by said device of which one part is movable into engagement with the other part to stop said reel in response to a movement of said control member to recording position.

MARVIN CAMRAS.

REFERENCES CITED

The following references are of record in the file of this patent:

UNITED STATES PATENTS

| Number | Name | Date |
|---|---|---|
| 1,155,776 | Washburn | Oct. 5, 1915 |
| 1,325,825 | Bailey | Dec. 23, 1919 |
| 1,638,998 | Hornauer | Aug. 16, 1927 |
| 1,560,721 | O'Reilly | Nov. 10, 1928 |
| 2,069,841 | Massonneau | Feb. 9, 1937 |
| 2,264,116 | Howsam | Nov. 25, 1941 |
| 2,335,277 | Heller | Nov. 30, 1943 |